(12) United States Patent
Sizer et al.

(10) Patent No.: US 6,185,855 B1
(45) Date of Patent: Feb. 13, 2001

(54) FISHING ROD HOLDER

(75) Inventors: Gerald R. Sizer, Minneapolis; Karl Harvey Lundahl, Stanchfiield, both of MN (US)

(73) Assignee: Outdoor Creations, Inc., Minneapolis, MN (US)

( * ) Notice: Under 35 U.S.C. 154(b), the term of this patent shall be extended for 0 days.

(21) Appl. No.: 09/350,907

(22) Filed: Jul. 12, 1999

Related U.S. Application Data

(63) Continuation of application No. 29/090,041, filed on Jun. 29, 1998, now Pat. No. Des. 416,071.

(51) Int. Cl.[7] ................................................. A01K 97/10
(52) U.S. Cl. ................................................. 43/21.2
(58) Field of Search ........................... 43/21.2; D22/147, D22/148; 248/517, 520, 530, 538

(56) References Cited

U.S. PATENT DOCUMENTS

| | | | |
|---|---|---|---|
| 178,012 | * 5/1876 | Koelsch | ................. 248/530 |
| D. 215,436 | 10/1969 | Moore . | |
| D. 267,031 | 11/1982 | Hamlin . | |
| D. 332,821 | 1/1993 | Padilla . | |
| D. 341,184 | * 11/1993 | Sperry | ................. D22/147 |
| 1,626,333 | 4/1927 | Fain et al. . | |
| 2,137,645 | * 11/1938 | Doench | ................. 43/21.2 |
| 2,293,305 | * 8/1942 | Oldham | ................. 43/21.2 |
| 3,586,274 | 6/1971 | Hart . | |
| 4,565,025 | 1/1986 | Behrle . | |
| 4,645,167 | 2/1987 | Hardwick . | |
| 4,694,603 | * 9/1987 | Anderson | ................. 43/21.2 |
| 4,739,575 | 4/1988 | Behrle . | |
| 5,383,299 | * 1/1995 | Smelker | ................. 43/21.2 |
| 5,437,122 | * 8/1995 | Wilson | ................. 43/21.2 |
| 5,551,183 | * 9/1996 | Solem | ................. 43/21.2 |
| 5,752,340 | 5/1998 | Fleener . | |

* cited by examiner

Primary Examiner—Kurt Rowan
(74) Attorney, Agent, or Firm—Burd, Bartz & Gutenkauf

(57) ABSTRACT

A fishing rod and reel holder having a one piece wire frame elevates and holds a fishing rod in an angular position relative to the frozen surface of a body of water. The holder has a generally flat base member and an angularly disposed helical body adapted to support the rod adjacent a hole in the frozen surface. The fishing rod is turned to position the shank of the fishing reel between coils of the helical body thereby releasably secure the rod to the holder.

8 Claims, 3 Drawing Sheets

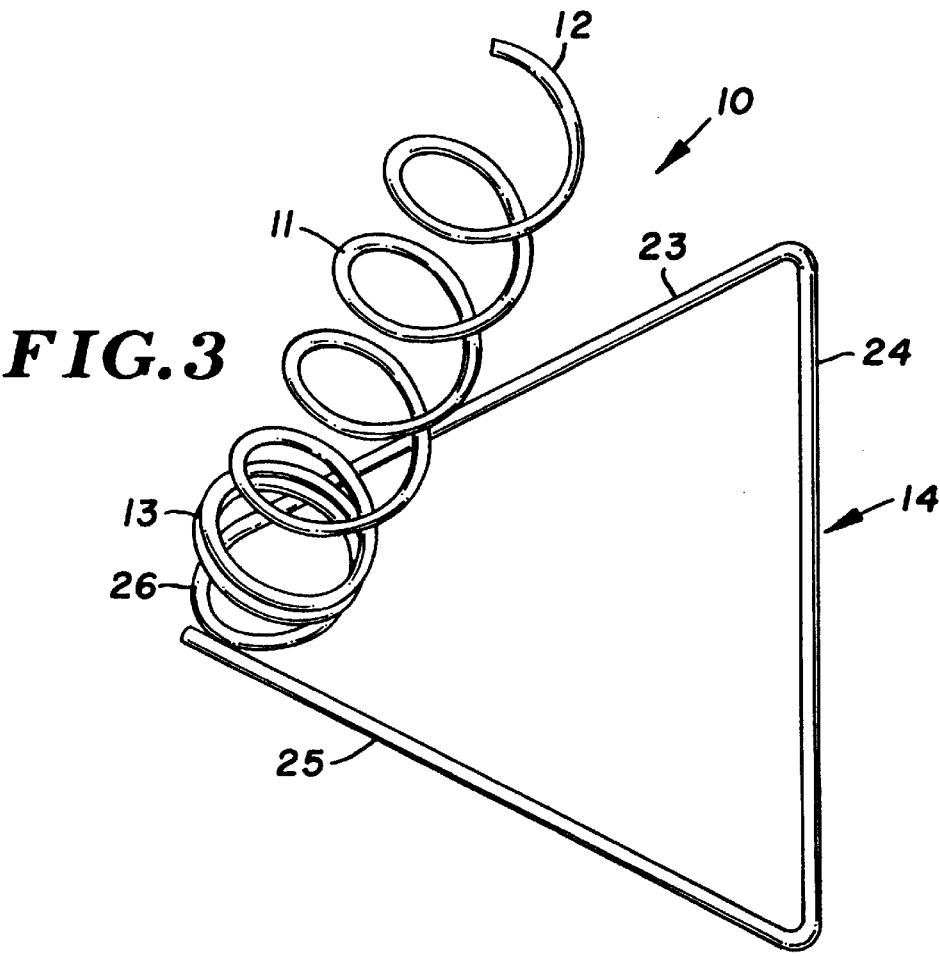
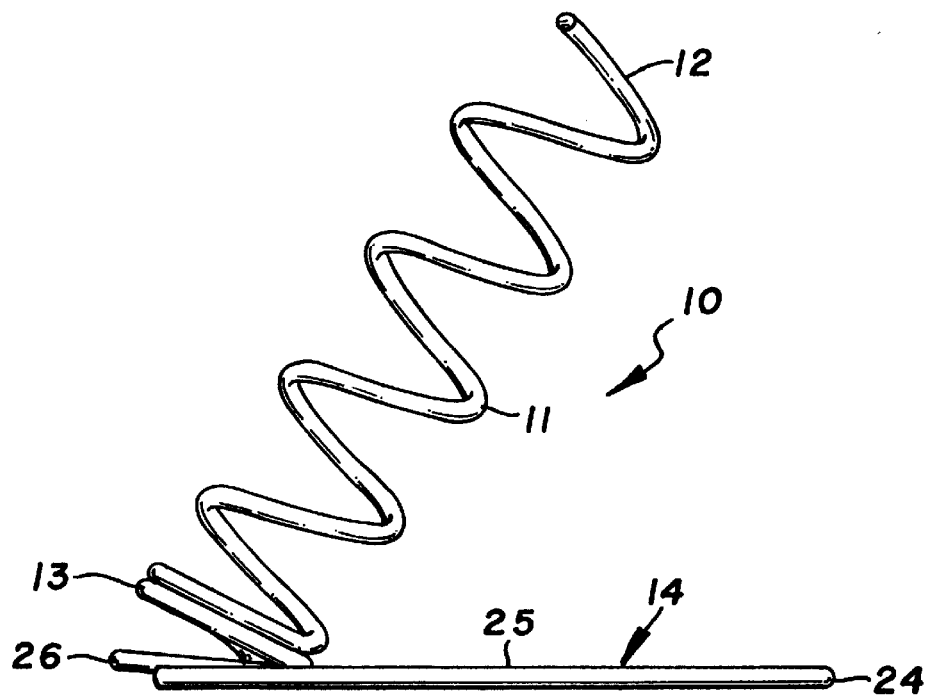

FISHING ROD HOLDER

CROSS REFERENCE TO RELATED APPLICATION

This application is a continuation of U.S. patent application Ser. No. 29/090,041 filed Jun. 29, 1998, now U.S. Pat. No. Des. 416,071.

FIELD OF THE INVENTION

The invention relates to fishing rod supports and, more particularly, to fishing rod holders and supports for holding an ice fishing rod adjacent a hole in the frozen surface of a body of water.

BACKGROUND OF THE INVENTION

Fishing on the frozen surface of a body of water, such as a lake, reservoir, and rivers in northern climates during cold weather months has become increasingly popular. Holes are drilled through the frozen surface to access fishing spots below the surface. In recent years, relatively short fishing rods equipped with ultra-light reels accommodating fish line are used to fish on frozen surfaces or ice fish. The fisherperson positions himself or herself adjacent the hole while fishing so as to observe the fish line extending through the hole and have the line enter the central portion of the hole. Commonly, the fisherperson sits or stands constantly holding the rod above the frozen surface. Fishing rods and reels, if placed on the ice and snow, become frozen and are difficult to operate properly. This limits the use of the fisherperson's hands to perform other tasks, such as preparing bait, fishing with a second fishing rod, holding hand warmers, and the like. It is also necessary for the fisherperson to remain in the immediate vicinity of the hole.

Fishing rod holders have been utilized by fisherpersons to relieve the fisherperson of having to constantly hold the rod. One common type of fishing rod holder has a cylindrical cup, one end of which is open to receive the lower end of the handle of the fishing rod and the other end of which is closed. Secured to the closed end is a spike adapted to be inserted into the ground or ice. The only way to move the holder is to remove the spike from the ground or ice and reinsert the spike at the desired new location. Frequent changes of fishing location are common while ice fishing to find active, biting fish. Also, ice conditions may make the removal and insertion procedures difficult. Further, the fishing rod may inadvertently separate from the rod holder due to a striking fish or from accidental contact from the fisherperson.

SUMMARY OF THE INVENTION

The invention is directed to a one-piece fishing rod holder for holding a fishing rod and reel, thereby freeing the hands of a fisherperson for other tasks such as preparing bait, fishing with another fishing rod, and the like. While ice fishing, the fisherperson is free to get up and walk around away from the ice fishing location. The holder retains the fishing rod and line above the surface of the ice and snow. The fishing rod is locked to the holder whereby a striking fish or inadvertent contact with the holder will not separate the rod from the holder. These and other advantages of the fishing rod holder of the invention are embodied in the fishing rod holder shown in the drawings and described in the following description of the preferred embodiments thereof.

The fishing rod holder has a generally flat base. Body means attached to the base is adapted to receive and hold a fishing rod in an angular position above a hole in a frozen surface of a body of water. The body means has an axis forming an acute angle with the plane of the base. The body means comprises a helical coil having a generally cylindrical axially extending opening adapted to receive the handle of the fishing rod. The coil has a continuous series of loops with a space between each loop. The top loop has an upper end spaced from the second loop to allow a fishing rod to be rotated relative to the coil whereby the fishing rod is releasably locked to the body means. The base has a circumference greater than the circumference of the hole in the frozen surface.

DESCRIPTION OF THE DRAWING

FIG. 3 is an enlarged perspective view of the fishing rod holder of FIG. 1;

FIG. 4 is an enlarged side elevational view of the fishing rod holder of FIG. 1;

DESCRIPTION OF PREFERRED EMBODIMENTS OF THE INVENTION

Figure 1:
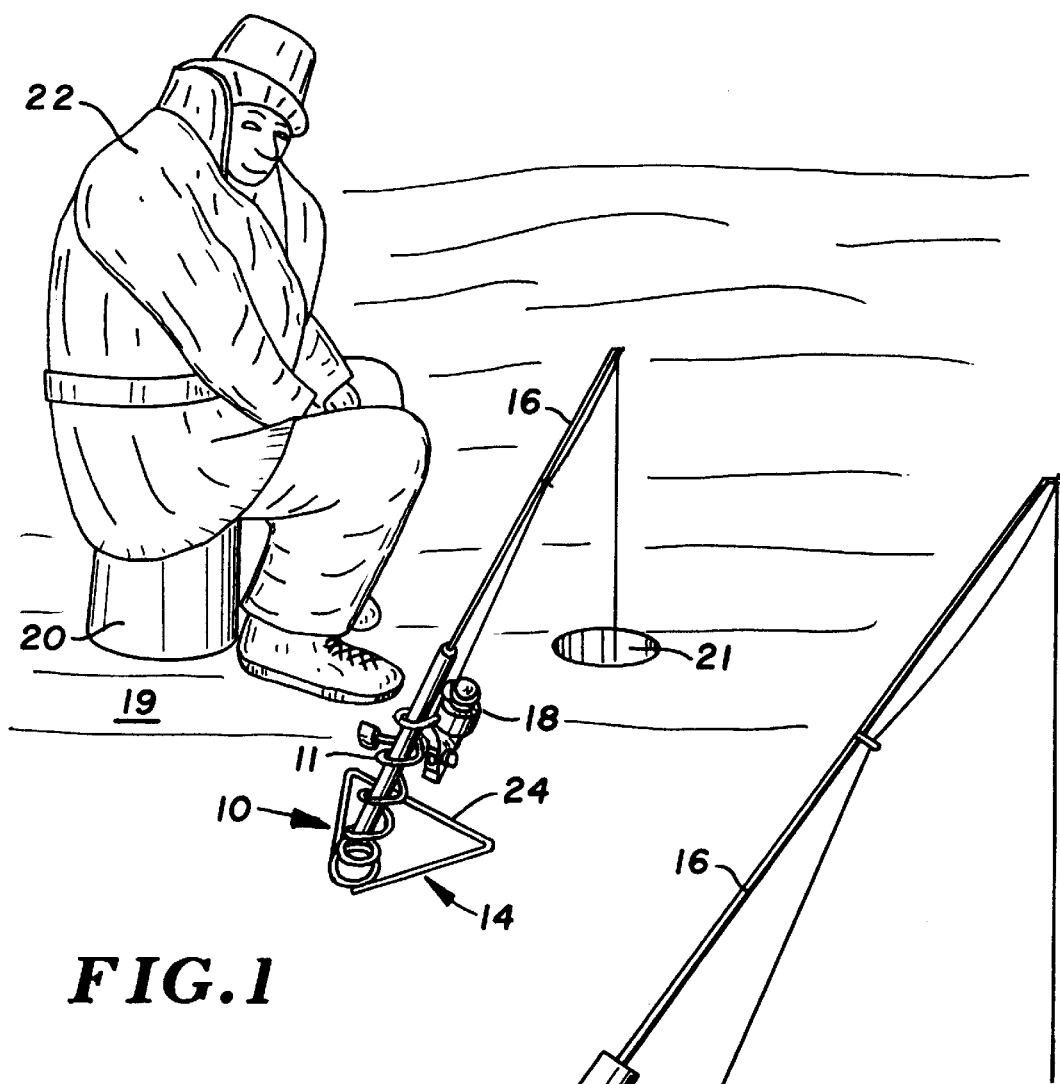
FIG. 1 is a perspective view of the fishing rod holder of the invention holding a fishing rod and reel used in an ice fishing environment.

Referring to FIGS. 1 to 4, a fishing rod holder of the invention, indicated generally at 10, is used to hold an ice fishing rod 16 and reel 18 above the frozen surface 19 of a body of water, such as a lake, pond, reservoir, or river, adjacent to a hole 21 in frozen surface 19. Fishing rod holder 10 can be used in other environments to support and hold fishing rods and reels in an elevated position. For example, holder 10 can be used on a riverbank, beach, shoreline, boat, and the like, to support and elevate rods and reels.

Figure 2:
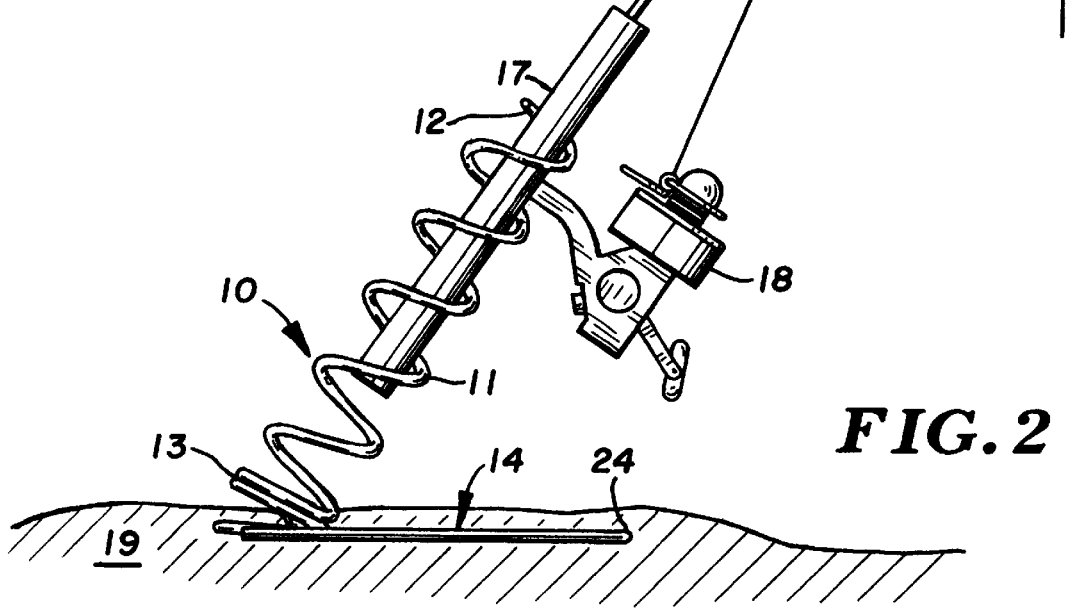
FIG. 2 is a side elevational view of FIG. 1.

Holder 10 is a one-piece rod wire member having a helical coil body 11 and a generally flat base 14. Body 11 has a spiral configuration having a continuous series of axially spaced coils or loops. The top coil of helical body 11 has an open end 12. End 12 is axially spaced from the intermediate coils of body 11. The opposite end of body 11 has a lateral coil 13 which is connected to a generally flat triangular shaped base 14 with a short arcuate section 26. Base 14 has a central opening and has a circumference larger than the circumference of a standard sized ice fishing hole. The axis of body 11 has an angular position relative to base 14. Body 11 is adapted to receive a handle 17 of a fishing rod 16 and hold the rod in an angular position, as shown in FIG. 2. Handle 17 is inserted into the top of body 11. Rod 16 is rotated clockwise or turned opposite from the direction of the spiral of body 11 to lock rod 16 to holder 10. The shank of reel 18 is supported on an intermediate coil, such as the second coil of body 11, and below the top coil of body 11. A fish pulling on the fishing line connected to reel 18 tends to pull rod 16 outwardly and move the shank of reel 18 into engagement with the top coil of body 11. Rod 16 cannot be separated from holder 10 without first rotating the rod counterclockwise to turn the shank of reel 18 adjacent the open end 12 of body 11. Thus, a relatively large fish, such as a northern pike, walleye or lake trout, pulling on the line cannot separate rod 16 from holder 10 upon striking and running with the baited end of the fish line. When base 14 is covered with snow and slush, as seen if FIG. 2, base 14 becomes frozen into surface 19 and anchors holder 10 to the surface. In the event a fish breaks base 14 free from the surface, holder 10 cannot be pulled through the hole since base 14 does not fit through the hole. Since rod 17 is locked to holder 10, it cannot be pulled through hole 21 separate from holder 10.

In use, rod 16 and reel 18 can be quickly accessed to hook and reel in fish. When a strike is detected, the fisherperson rotates the rod 16 counterclockwise unlocking rod 16 from holder 10 and removes the rod from the holder. Holder 10 relieves the fisherperson of having to constantly hold the rod during periods of inactivity. Holder 10 supports rod 16 in the same angular position as the angular position of body as handle 17 of rod 16 telescopes into body 11. Fishing rod 16 and reel 18 are elevated above the ice and snow, reducing freeze-ups and operation difficulties.

Holder 10 can also be used in other fishing environments, such as in surf or shore fishing environments. Base 14 is anchored on a beach or shore adjacent a body of water, the ocean or a river to elevate and support rod 16 at an angular position relative to the surface of the water. After the line is cast into the water, rod 16 is secured to holder by inserting the lower end of rod handle 17 into the open top of body 11 and turning rod 16 to move shank of reel 18 into an intermediate portion of body 11. The fisherperson is free to enjoy the sun, surf, and sand as holder 10 retains and elevates fishing rod 16. When a fish pulls on the fishing line connected to reel 18 and pulls rod 16 outwardly, the shank of reel 18 is moved into engagement with the top coil of body 11 preventing rod 16 from being separated from holder 10.

Figure 5:
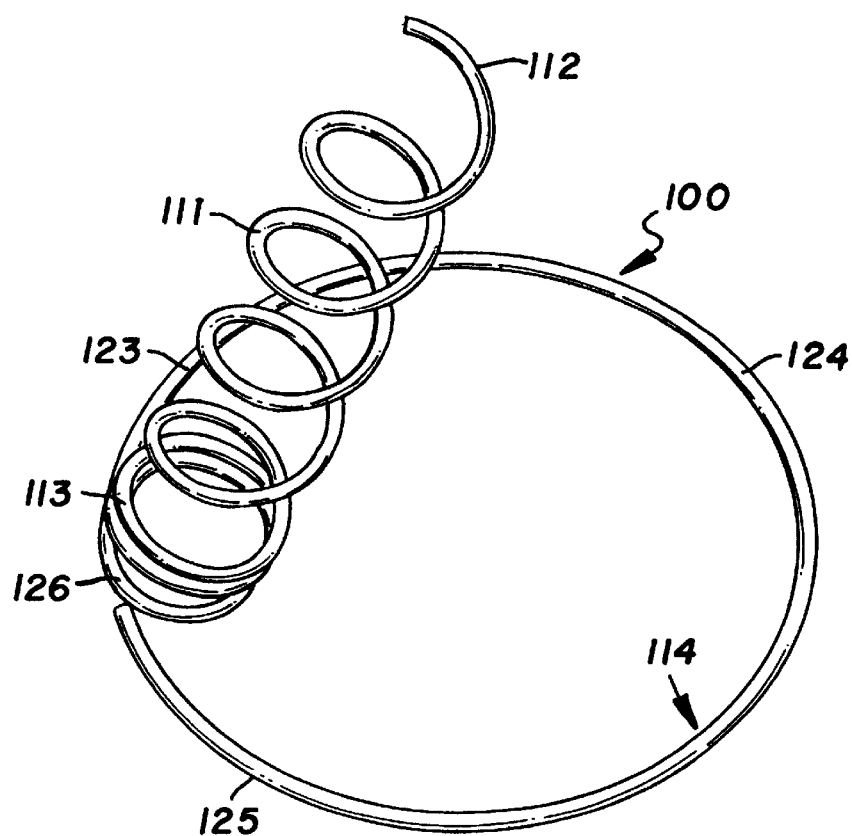
FIG. 5 is a perspective view of a modification of the fishing rod holder.
Figure 6:
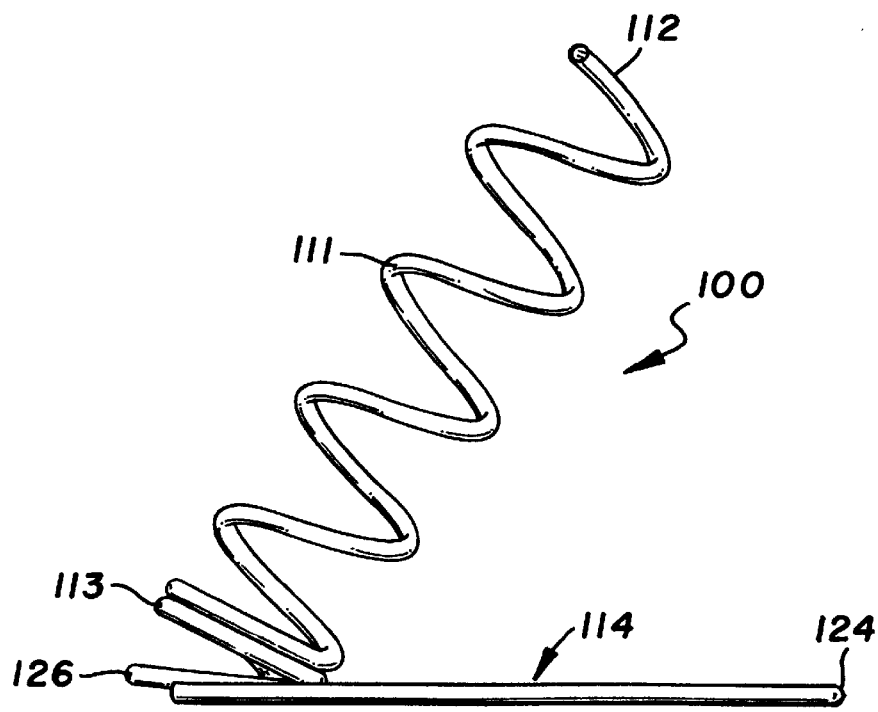
FIG. 6 is a side elevational view of the fishing rod holder of FIG. 5.

A modification of fishing rod holder 100 is shown in FIGS. 5 and 6. The parts of holder 100 that correspond to the parts of holder 10 have the same reference number with a prefix 1. The top of helical coil body 111 has an open or free end 112. A generally flat, circular shaped base 114 is attached to the bottom of body 111. Base 114 is covered with snow, slush and ice to freeze the base into the surface 19 of the body of water. Base 114 has a circumference larger than the circumference of a standard sized ice fishing hole. Body 111 has an angular position relative to base 114. Body 111 accommodates the tubular handle 17 of fishing rod 16. Fishing rod 16 is rotated clockwise or opposite from the spiral of body 111 to position the shank of reel 18 adjacent an intermediate coil of body 111 below the top coil of the body. Rod 16 cannot be separated from holder 100 without first rotating the rod counterclockwise or in the same direction of the spiral of body 111 to move the shank of reel 18 adjacent the open end of body 111. A fish pulling on the line pulls rod 16 outwardly and moves the shank of reel 18 into engagement with the top coil of body 111 limiting further outward movement of rod 17. The fish cannot separate rod 16 from holder 100 upon striking and running with the baited end of the line as rod 16 is locked to body 111 and base 114 is frozen into or otherwise anchored on the surface. In the event the fish breaks base 114 free from the ice and snow, rod 16 cannot be pulled through the hole in the ice because base 114 does not fit through the hole and rod 16 cannot be pulled through the hole separate from holder 100.

From the foregoing specification and drawings are directed to preferred embodiments of the fishing rod holder of the inventions. It is understood that various changes and modifications in structures, arrangement of structures and materials may be made by persons skilled in the art without departing from the invention.

I claim:

1. A fishing rod and reel holder comprising: a one piece rod wire member having an upper angular portion and a lower generally horizontal base portion having a front and rear, the upper portion comprising a helical coil extending upwardly from the rear of the base portion, the coil having a generally cylindrical opening extending axially through the coil for receiving the fishing rod and reel and holding the rod and reel in an angular position above a surface, the coil having a longitudinal axis forming an acute angle with the plane of the base portion, the coil extending upwardly and forwardly from the rear of the base portion to an elevated position above and rearwardly from the front of the base portion, the helical coil having a continuous series of axially spaced loops, the helical coil having a lower end an open upper end, said axially spaced loops extend upwardly from the lower end to the upper end of the helical coil to allow a transverse section of the fishing reel to be located between the loops and limit outward movement of the fishing rod and reel relative to the helical coil, and a single lateral coil connecting the base portion to the lower end of the helical coil.

2. The fishing rod and reel holder of claim 1 wherein: the coil has an axis forming a 45° angle with the plane of the base portion.

3. The fishing rod and reel holder of claim 1 wherein: the lower portion is a generally flat triangular shaped frame having a central opening.

4. The fishing rod and reel holder of claim 1 wherein: the lower portion is a generally flat circular shaped frame having a central opening.

5. A fishing rod and reel holder comprising: a one piece rod wire member having an upper angular portion and a lower generally horizontal base portion having a front and rear, the upper portion comprising a helical coil extending upwardly from the rear of the base portion, the coil having a generally cylindrical opening extending axially through the coil for receiving the fishing rod and reel and holding the rod and reel in an angular position above a surface, the coil having a longitudinal axis forming an acute angle with the plane of the base portion, the coil extending upwardly and forwardly from the rear of the base portion to an elevated position above the base portion, the helical coil having a lower end, an open upper end, and axially spaced loops extend upwardly from the lower end to the upper end of the helical coil to allow a transverse section of the fishing reel to be located between the loops and limit outward movement of the fishing rod and reel relative to the helical coil, and a single lateral coil connecting the rear of the base portion to the lower end of the helical coil, a diameter of said single lateral coil being substantially equal to a diameter of said helical wire.

6. The fishing rod and reel holder of claim 5 wherein: the base has a generally flat triangular shape.

7. The fishing rod and reel holder of claim 5 wherein: the base has a generally flat circular shape.

8. The fishing rod and reel holder of claim 5 wherein: the coil has an axis extended upwardly from the base at an angle of about 45°.

* * * * *